June 14, 1938.  T. J. SCOFIELD  2,120,955
GAS DISCHARGE TUNING INDICATOR
Filed Jan. 25, 1935   2 Sheets-Sheet 1
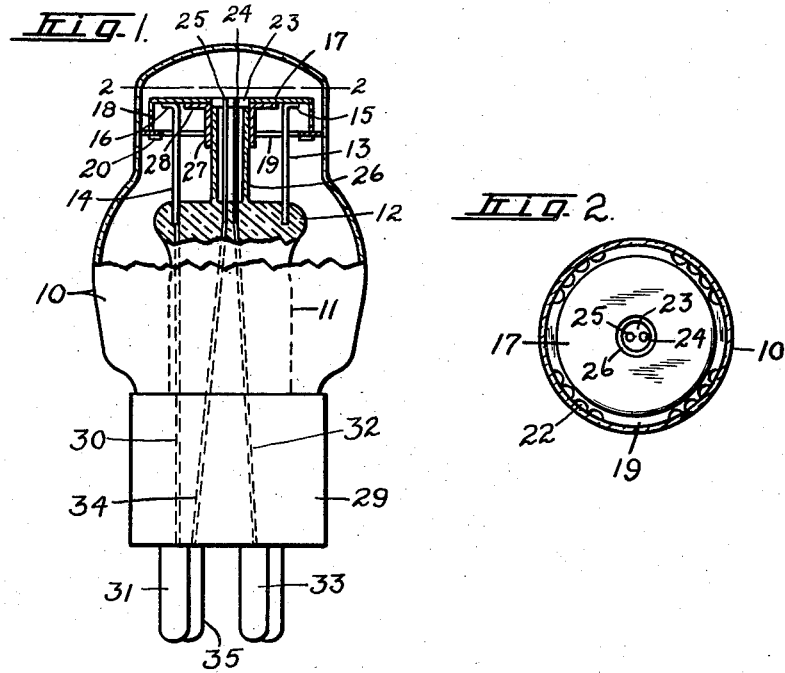
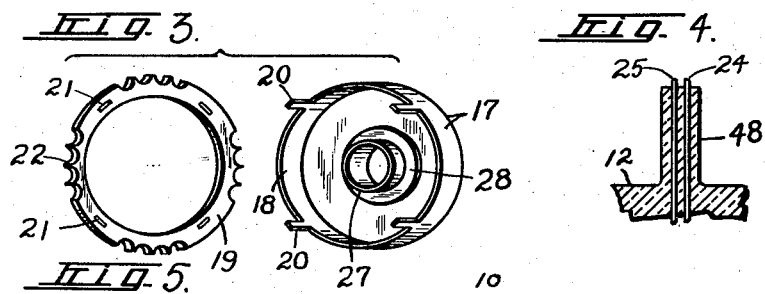
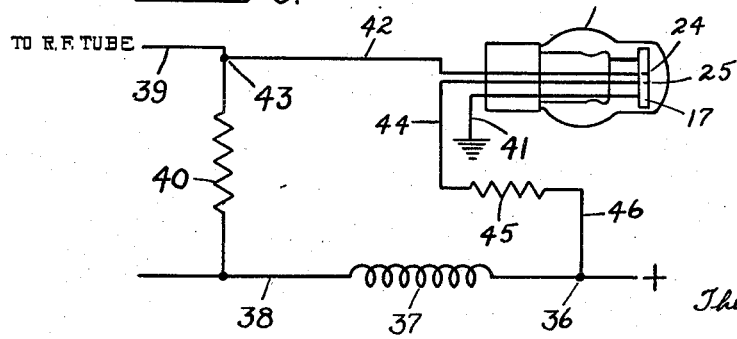
WITNESS
J. J. Mains
INVENTOR
Theodore J. Scofield
BY
Theodore E. Simonton
ATTORNEY June 14, 1938.  T. J. SCOFIELD  2,120,955
GAS DISCHARGE TUNING INDICATOR
Filed Jan. 25, 1935  2 Sheets-Sheet 2
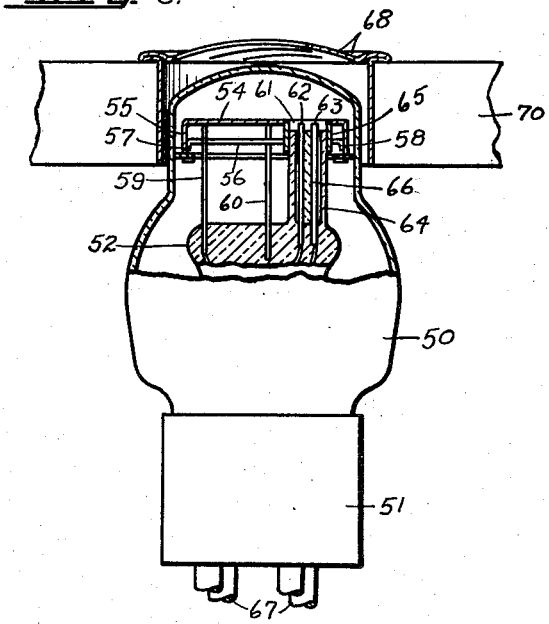
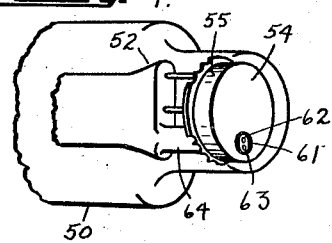
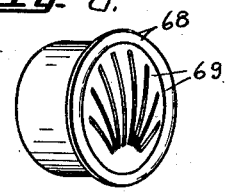
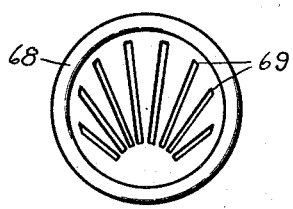
WITNESS
J. T. Mains
INVENTOR
Theodore J. Scofield
BY
Theodore E. Simonton
ATTORNEY Patented June 14, 1938

2,120,955

UNITED STATES PATENT OFFICE 2,120,955

GAS DISCHARGE TUNING INDICATOR

Theodore J. Scofield, Jackson, Mich., assignor to The Sparks-Withington Company, Jackson, Mich., a corporation of Ohio Application January 25, 1935, Serial No. 3,432

5 Claims. (Cl. 250—27.5)

This invention relates to a new and improved gas discharge device for visually indicating current and voltage variations, and more specifically, to a gas discharge device adapted to be used as a visual tuning indicator for a radio receiving set.

Glow discharge tubes that exhibit variations in light intensity in accordance with variations of the applied potential have been used in the past to indicate roughly variations in electrical potential. As visual indicators, glow discharge tubes of this type are unsatisfactory for accurately indicating potential changes through a maximum or minimum value, since the human eye has difficulty in distinguishing between small variations of light intensity.

I have discovered that by utilizing a particular form and arrangement of electrodes within a discharge tube, the glow discharge can be confined to a flat surface and made responsive to potential changes so that the area of the glow is proportional to the potential applied across the electrodes of the tube. Thus, small changes of potential in the region of the maximum or minimum limit of a particular potential variation can be observed by the eye for determining either the maximum or minimum condition. A glow discharge tube of this type is, therefore, particularly adapted to indicate when the input amplifier of a radio receiver is properly adjusted or tuned to an incoming signal of a given frequency so as to secure maximum signal strength.

The main object of this invention is to provide a glow discharge device for visually indicating electrical voltage and current variations and which is capable of giving an accurate indication of a maximum or minimum voltage condition.

A further object of the invention is to provide a glow discharge tuning indicator for a radio receiver that is capable of giving an accurate visual indication of maximum response in the selector circuit.

More specifically, it is an object of this invention to provide a tuning indicator for a radio receiver of the gas discharge type having a circular electrode upon which the glow discharge is confined and adapted to be varied in area in accordance with the strength of the incoming signal.

Other objects and advantages relate to the particular construction of the gas discharge device and will appear more fully in the following description taken in connection with the accompanying drawings, in which:

Figure 1 illustrates the gas discharge device of my invention, the electrode assembly of which is shown in vertical cross section;

Figure 2 is a cross sectional view taken along line 2—2 of Figure 1;

Figure 3 shows in perspective, the cathode electrode and an insulating spacing member therefor;

Figure 4 is a vertical cross sectional view showing a modified arrangement for supporting the anode and keep-alive electrodes;

Figure 5 is a schematic circuit diagram showing the gas discharge indicator operatively connected to a radio receiver circuit.

Figure 6 illustrates a gas discharge device having a modified electrode arrangement, shown in conjunction with an external mask adapted to be mounted in the control panel of a radio receiver.

Figures 7 and 8, respectively, illustrate the gas discharge tube and mask in perspective for the purpose of showing the relative position of tube and mask during operation; and Figure 9 is a face view of the mask showing the arrangement of the slots therein.

Referring to the drawings, the reference numeral 10 designates a sealed glass bulb having a re-entrant tubular stem 11. The stem 11 is closed at its upper end to form a press 12 typical of the press structures of radio vacuum tubes. Embedded in the press 12 are two upstanding rods 13 and 14. The upper ends of the rods 13 and 14 may be bent over at right angles to form extensions 15 and 16.

To the extensions 15 and 16 may be secured, as by spot welding, a circular disk electrode 17, preferably of carbonized nickel, and having a downwardly extending marginal flange 18. The electrode 17, which is to serve as a cathode, may be of a diameter slightly less than the diameter of the adjacent walls of the bulb 10.

In order to axially aline electrode 17 within the bulb, I have provided an annular spacing member 19 preferably of insulating material, such as mica, and which may be secured to the lower edge of the flange 18 by means of a plurality of fingers 20 either formed integrally with the flange, or in any well known manner. The fingers 20 are adapted to be passed through preformed apertures 21 in the spacing member 19 and then bent over to secure the spacing member firmly to the lower edge of the flange 18. Since the periphery of the spacing member 19 is adapted to contact with the inner walls of the bulb 10, it is desirable to provide the same with serrations 22 or other suitable passages for enabling a free circulation of gas around the cathode.

The cathode electrode 17 is also provided with a centrally positioned opening 23 which is of relatively small diameter as compared with the diameter of the electrode. Rising from press 12 and projecting into the opening 23 are two rod-like electrodes 24 and 25, preferably of nickel. Electrode 24 is adapted to serve as an anode whereas electrode 25 may function as a keep-alive, the action of which will be more fully described later.

Surrounding electrodes 24 and 25 is a tubular glass shield 26, the lower portion of which may be sealed into press 12. The upper portion of shield 26 is adapted to project into a closely fitting metallic sleeve 27. The upper portion of sleeve 27 is provided with a flange 28 which may be secured to the under side of electrode 17 by spot welding, or in any other suitable manner. The bore of sleeve 27 is adapted to aline with the opening 23 in electrode 17.

The lower portion of bulb 10 is provided with a conventional vacuum tube base 29 having a plurality of contact prongs projecting from the lower side thereof. A lead-in conductor 30 leading from prong 31 is connected to support rod 14 which is in contact with the cathode electrode 17. Electrode 24 is connected by lead-in conductor 32 to prong 33, and electrode 25 is connected by a similar lead-in conductor 34 to prong 35.

The bulb 10 is evacuated and filled with an inert gas, as neon, to a pressure of approximately 15 millimeters of mercury. The exact pressure to be used will depend upon the range of voltage which it is desired to employ across the anode and cathode. I have found that a 15 millimeter pressure is suitable for a tube adapted to be used as a tuning indicator for the average radio receiver. At a pressure of 15 millimeters, a potential of 180 volts impressed across the anode and cathode will initiate a glow upon the surface of the cathode closely surrounding the opening 23. An increase in potential to 220 volts will cause the glow to spread to the edge of the cathode. The above characteristics apply to a tube structure in which the cathode 17 is substantially one inch in diameter and the central opening 23 is approximately 0.15 inch in diameter, and the electrodes 24 and 25 are approximately 0.03 inch in diameter and terminate substantially flush with the plane of the cathode. The upper end of the bulb 10 may be somewhat flattened, as shown in Figure 1, in order that the glow on the upper surface of the cathode may be more easily observed.

When used as a tuning indicator for radio receivers, particularly receivers employing automatic volume control, the gas discharge tube may be connected in an operative circuit as shown in Figure 5. Since the general arrangement of radio receiving circuits is well known, only that portion of the circuit is shown which applies directly to the operation of the tuning indicator. The terminal 36 represents the highest positive potential point on the —B— or plate voltage supply for the radio receiver. Current from this point is conducted to the plate circuits of the vacuum tubes through a conventional filter choke 37 and a conductor 38. The plate circuits of the radio frequency tubes of the receiver are connected by conductor 39 through a resistor 40 to the conductor 38.

The cathode 17 of the tuning indicator is connected by conductor 41 to ground. The anode 24 is connected by conductor 42 to conductor 39 at terminal 43 which is at a potential considerably above ground potential but lower than the high potential terminal 36 of the power supply.

It is well known that in a receiver employing automatic volume control in the radio frequency amplifier, the plate current in the radio frequency tube or tubes decreases with increasing signal strength as a result of automatic volume control action occasioned by a change in signal strength. Thus, as the radio frequency amplifier is being tuned to resonance, the plate current drawn through resistor 40 will decrease reaching a minimum at resonance. The voltage drop across the resistor 40 is, therefore, also a minimum at resonance. The voltage from terminal 43 to ground for this particular condition, however, rises with an increase in signal strength, reaching a maximum at resonance. This voltage is applied across the cathode 17 and the anode 24 to produce a glow spreading in a circular manner over the surface of the cathode and increasing in area with an increase in signal strength. At resonance, the impressed voltage across the indicator is a maximum, which condition is indicated by a maximum area of the glow discharge on the face of the cathode.

In practice, I have found that the glow discharge can be properly controlled by using neon gas in the discharge tube at a pressure of approximately 15 millimeters of mercury with the voltage at terminal 36 of the radio receiver power supply of approximately 275 volts, and using a resistance 40 having a value of approximately 20,000 ohms. Under these conditions, the glow discharge is initiated when the voltage across the anode and cathode is approximately 180 volts. The glow discharge spreads to the edge of the cathode when the potential difference between the electrodes reaches approximately 220 volts.

It is known that the potential required to start a glow discharge is higher than that required to maintain it. For this reason, the glow discharge on the surface of cathode 17 may not, at all times, be initiated after being extinguished as a result of insufficient signal voltage occasioned by tuning from station to station, or by switching off the receiver.

In order to overcome this difficulty, use is made of the auxiliary electrode 25 which may be termed a keep-alive electrode. The electrode 25 is connected by conductor 44 to a current limiting resistor 45 which is connected by conductor 46 to terminal 36 on the power supply of the radio receiver. The electrode 25 is an anode with respect to both electrodes 24 and 17. A value of resistor 45 is selected that will limit the current through the tube to a value that will produce a small glow discharge closely confined about the opening 23 in the cathode 17. By way of example, resistor 45 may have a value of one megohm when the voltage at terminal 36 is approximately 275 volts. It will, of course, be understood that for higher voltages at the power supply source, the value of resistor 45 may be increased accordingly. The glow discharge produced by the keep-alive electrode is not in any way affected by tuning the receiver from station to station and serves merely to initiate and maintain the discharge when insufficient voltage is impressed across the cathode 17 and the anode 24.

I have found that the operation of the keep-alive electrode 25 may be improved by sealing both electrodes 24 and 25 in a glass rod 48 leaving only the tips of the electrodes exposed, as clearly shown in Figure 4. It will be understood that the same results may be obtained by sealing the upper portion of tubular shield 26 closely about the electrodes.

In order that small changes in area of the glow on the face of the cathode may be more easily observed, the electrode arrangement of the discharge tube may be modified as shown in Figure 6. In general the bulb 50, base 51 and press 52 are the same as shown in Figure 1. The cathode 54, in this instance, also consists of a circular disk having a downwardly extending marginal flange 55. A support rod 56 may be provided having its ends bent over at right angles to form extensions 57 and 58. The extensions 57 and 58 may be secured to diametrically opposite points on the flange 55 by spot welding or other suitable means.

Rising from the press 52 are two upstanding rods 59 and 60, each of which may be welded in cross engaging relationship to support rod 56. The cathode electrode 54 is provided with an eccentrically positioned opening 61 which is of relatively small diameter as compared with the diameter of the electrode. Rising from press 52 and projecting into the opening 61 are two electrodes 62 and 63 which respectively serve as anode and keep-alive electrodes.

The electrodes 62 and 63 are preferably surrounded by a tubular glass shield 64, the lower portion of which is sealed in press 52. The upper portion of shield 64 is adapted to project into a closely fitting metallic sleeve 65 extending downwardly through the opening 61. The sleeve 65 may be secured to cathode 54 by expanding the upper end portion of the sleeve in tight engaging relation with the side of the opening 61. A strip of insulation 66, as mica, may be inserted between electrodes 62 and 63 for the purpose of maintaining these electrodes in proper spaced relation. If desired, electrodes 62 and 63 may be sealed in a glass shield as shown in Figure 4.

Electrodes 54, 62 and 63 may be connected by suitable lead-in conductors, not shown, to respective contact prongs 67 extending from the base 51 for the purpose of making external circuit connections.

Upon connecting the discharge device in an operative circuit as shown in Figure 5, the initiated glow will spread from the off-center opening 61 in an eccentric manner with respect to the surface of the cathode with an increase in applied potential across the anode and cathode. Changes in area of the glow upon the surface of the cathode 54 may be made more perceptible by employing a cup-shaped mask 68 over the end of the bulb 50. The face of mask 68 is provided with a series of slots 69 arranged in fan formation. Otherwise, the mask 68 is constructed so that it may be conveniently mounted in a control panel 70 of a radio receiver as shown in Figure 6.

In practice, the mask 68 may be conveniently mounted in the control panel of a radio receiver and the discharge tube may be positioned in back of the radio panel with the forward end of the tube projecting into the mask 68 and with the cathode aperture 61 in alinement with the converging ends of slots 69. The relative positions of cathode 54 and mask 68 for a preferred condition of operation are shown in Figures 7 and 8. Thus as the glow spreads over the surface of the cathode, increasing or decreasing in area, it will appear to an observer in front of the mask in the form of a series of narrow pencils of light defined by the slots 69, increasing or decreasing in length in proportion to the applied potential across the tube. It is, therefore, apparent that when observing the glow through a mask of the type described herein, small changes of potential across the anode and cathode will be more readily discernible than when observing the area of the glow as a whole.

Although I have shown and described several gas discharge tube structures, and in some instances, have given specific values of gas pressure, operating voltages and electrode dimensions, it is to be understood that the same are for illustrative purposes, and that changes and modifications can be made by those skilled in the art without departing from the spirit and scope of the appended claims.

I claim:

1. A gas discharge tube for visually indicating variations in electrical potential comprising a bulb containing an inert gas, a press within the bulb, a substantially flat circular cathode supported by said press and having an opening therethrough, an anode supported by said press and extending into said opening and terminating substantially flush with the face of said cathode, an insulating shield surrounding said anode and extending from said press to said opening, whereby a glow discharge may be produced on the face of said cathode varying in area in accordance with the variations of the applied voltage, and a keep-alive anode substantially paralleling said first anode and spaced therefrom within said insulating shield.

2. The combination as claimed in claim 1 in which said opening is eccentrically positioned in said cathode.

3. A gas discharge tube for visually indicating variations in electrical potential comprising a bulb containing an inert gas, a press within the bulb, a substantially flat circular cathode supported by said press and having an eccentrically positioned opening therethrough, an anode supported by said press and extending into said opening and terminating substantially flush with the face of said cathode, an insulating shield surrounding said anode and extending from said press to said opening, whereby a glow discharge may be produced on the face of said cathode varying in area in accordance with the variations of applied voltage, and a cup-shaped mask mounted adjacent said tube and having a series of slots therein through which said glow discharge may be observed.

4. The combination as claimed in claim 3 in which said slots in said mask are arranged in fan formation and overlie said cathode with the converging ends of said slots in substantial registration with the opening in said cathode.

5. The combination as claimed in claim 3 in which a keep-alive anode substantially parallels said first anode and is spaced therefrom within said insulating shield.

THEODORE J. SCOFIELD.